United States Patent [19]
Jean et al.

[11] Patent Number: 5,872,071
[45] Date of Patent: Feb. 16, 1999

[54] LOW-FIRE DIELECTRIC COMPOSITION AND ITS USE IN LAMINATED MICROWAVE DIELECTRIC CERAMIC ELEMENTS

[75] Inventors: Jau-Ho Jean; Shih-Chun Lin, both of Hsinchu, Taiwan

[73] Assignee: National Science Council, Taiwan

[21] Appl. No.: 81,590

[22] Filed: May 20, 1997

[30] Foreign Application Priority Data

Oct. 7, 1997 [TW] Taiwan ................................. 86114623

[51] Int. Cl.$^6$ .................................................. C04B 35/468
[52] U.S. Cl. ............................................. 501/138; 501/137
[58] Field of Search .................................... 501/135, 138, 501/136

[56] References Cited

U.S. PATENT DOCUMENTS

| | | |
|---|---|---|
| 4,672,152 | 6/1987 | Georges . |
| 4,755,490 | 7/1988 | DiLazzaro . |
| 5,100,871 | 3/1992 | Chen et al. ................................. 505/1 |
| 5,122,510 | 6/1992 | Chen et al. ................................. 505/1 |
| 5,262,368 | 11/1993 | Hood et al. . |
| 5,280,013 | 1/1994 | Newman et al. ............................ 515/1 |
| 5,415,945 | 5/1995 | Azumi et al. . |
| 5,449,652 | 9/1995 | Swartz et al. . |
| 5,461,014 | 10/1995 | Chu et al. . |

FOREIGN PATENT DOCUMENTS 159830  1/1979  China .

*Primary Examiner*—Deborah Jones
*Attorney, Agent, or Firm*—Finnegan, Henderson, Farabow, Garrett & Dunner, L.L.P.

[57] ABSTRACT

The present invention relates to a dielectric composition which can be densified at a temperature no higher than 1000° C. and can provide ceramic products with a dielectric constant of 35 to 40 and a quality constant of 1000 to 5000 at 7 GHz. The dielectric composition comprises 0.1 to 50 wt % $BaCuO_2$—$CuO$ and 99.9 to 50 wt % $ZrO_2$—$SnO_2$—$TiO_2$. Multilayered microwave dielectric ceramic elements can be prepared by mixing the composition of the present invention with an organic solvent, a polymer binder and a plasticizer, forming a green sheet from the mixture by tape casting, screen-printing and laminating the green sheet, and then co-firing the ceramic laminate with a metal that is high in electrical conductivity such as Au, Cu and Ag.

18 Claims, No Drawings

LOW-FIRE DIELECTRIC COMPOSITION AND ITS USE IN LAMINATED MICROWAVE DIELECTRIC CERAMIC ELEMENTS

FIELD OF THE INVENTION

The present invention relates to dielectric ceramic compositions, especially to dielectric compositions for use in microwave dielectric ceramic elements. The dielectric composition of the present invention can be densified at low temperatures to provide products with a high dielectric constant and a high quality factor.

BACKGROUND OF THE INVENTION

In view of the high growth of wireless communication systems such as cellular mobile phones, portable wireless phones and global satellite position systems, the development of small and light portable mobile phones is a natural trend. Therefore, small microwave elements are highly desired in the industry.

Therefore, various multi-layered electronic devices have been developed to increase the volume efficiency to meet the above requirements. Also, it is desired that high frequency ceramic filters are multilayered and small in size. For the preparation of multilayered ceramic filters, the devices have to be cofired with low loss conductors such as silver and copper. Therefore, the development of materials which can be sintered at low temperatures into microwave ceramic devices with a high dielectric constant is highly desired.

In view of the trend for the miniaturization and modulization of high frequency microwave communication devices, it is very important to obtain materials which can be sintered at low temperatures into ceramics with a high dielectric constant. A microwave ceramic material has to have a high dielectric constant in order to meet the requirements for miniaturization, a high quality factor (i.e. low dielectric loss) to provide high-quality high-frequency signals.

The frequency of microwaves ranges from 0.9 to 300 GHz. The properties of selected microwave ceramic materials must meet the following requirements for miniaturization:

K: 10–90;

Tan δ: $<10^{-3}$;

$TC_f$: $^-10$–$10$ $MK^{-1}$ wherein K is the dielectric constant; Tan δ is the dielectric loss and $TC_f$ is the temperature coefficient. The size of ceramic filters decreases with increasing its dielectric constant. Furthermore, the less the dielectric loss, the better the quality factor and thus, the better the high-frequency signals. Moreover, the temperature coefficient should be close to zero so as to ensure that the change of resonance frequency with temperature is negligible.

There are various microwave ceramic materials such as $CaZr_{0.985}Ti_{0.015}O_3$, $BaTi_4O_9$, $ZrO_2$—$SnO_2$—$TiO_2$ and $(Ba, Pb)Nd_2Ti_5O_4$. However, all these materials have sintering temperatures above 1300° C. which is too high to cofire with highly conductive metals such as Ag and Cu. Approaches taken to reducing the sintering temperature to 1000° C. or less include using fine powders prepared by chemical processes, adding glass into microwave ceramic materials, or using sintering flux.

U.S. Pat. No. 5,449,652 describes a microwave dielectric ceramic composition comprising $Bi_{(2-x)}(Zn_{(2+y)/3}Nb_{(4/3)})O_{(7-3x/2+y/3)}$ wherein 0.24<x<0.333, 0.120<y<0.3; and $Bi_{(1-z)}Ca_{(z)}(Zn_{(2+y)/3}Nb_{(4/3)})O_{(7-3x/2+y/3+xz/-z)}$ wherein 0<x<0.667, 0<y<0.30, 0<z<0.2. The properties of the microwave dielectric ceramic composition are as follows: dielectric constant >100; quality factor (@ 7 GHz)=7000; temperature coefficient=10 ppm/°C.

U.S. Pat. No. 4,672,152 describes a ceramic composition with a low sintering temperature and a low dielectric constant which comprises 50–95 wt % crystallizable glass and 5–50 wt % ceramic filler. The dielectric system has a dielectric constant of 5.1–6.0. The crystallizable glass consists of 5–20 wt % lithium oxide, 60–90 wt % silicon dioxide, 1–10 wt % aluminum oxide, and 1–5 wt % alkaline metal oxide other than lithium oxide. The ceramic filler includes silicon dioxide and aluminum oxide.

U.S. Pat. No. 4,755,490 describes a ceramic composition with a low sintering temperature and a low dielectric constant which comprises 10–50 wt % alumina, 0–30 wt % fused silica, and 50–60 wt % of a frit comprised of 4 wt % CaO, 12 wt % MgO, 29 wt % $B_2O_3$ and 42 wt % $SiO_2$. The dielectric composition has a sintering temperature below 1000° C., a dielectric constant of 4.5–6.1, and a linear thermal expansion coefficient of 3.9–4.2×$10^{-6}K^{-1}$.

U.S. Pat. No. 5,415,945 describes a ceramic composition with a low sintering temperature and a high dielectric constant which comprises 75–85 mol % $Pb(Ni_{1/3}Nb_{2/3})O_3$+ 0–15 mol % $PbTiO_3$+5–16.5 mol % $Pb(Zn_{1/2}W_{1/2})O_3$+Pb$(Cu_{1/3}Nb_{2/3})O_3$. The composition has a sintering temperature of 1000° C. and a dielectric constant of 1000–4000.

U.S. Pat. No. 5,262,368 describes a ceramic composition with a low sintering temperature and a high dielectric constant which comprises $BaTiO_3$, $BaCuO_2$, $WO_3$ and $MoO_3$. The system has a sintering temperature of 1150° C., a dielectric constant of 2000–3000 (1 KHz) and a dielectric loss of 2.5%–16% (1 KHz).

U.S. Pat. No. 5,461,014 describes a ceramic composition with a low sintering temperature and a high dielectric constant which comprises $Pb(Mg_{1/3}Nb_{2/3})O_3$ and $BaCuO_2$. The system has a sintering temperature of 1050° C., a dielectric constant of 7000–8000 (1 KHz) and a dielectric loss less than 3%.

ROC Patent Publication No. 159830 describes a ceramic composition with a high dielectric ceramic composition which is comprises $Pb(Mg_{1/3}Nb_{2/3})O_3$—$PbTiO_3$—$Pb(Zn_{1/3}Nb_{2/3})O_3$. The system has a sintering temperature of less than 1000° C. and a dielectric constant of 8000–10000.

In view of the above, it is obvious that ceramic materials which have a low sintering temperature, a high dielectric constant and a high quality factor (i.e. low loss) are needed in the industry. The present invention provides a way to meet this requirement.

SUMMARY OF THE INVENTION

The present invention relates to a dielectric composition which can be sintered at a low temperature by liquid phase sintering to provide microwave dielectric ceramic devices with a high dielectric constant and a high quality factor. Since the ceramic composition of the present invention can be sintered at a low temperature, the composition is compatible with conductors having a low melting point and low resistance such as Ag, Au and Cu. It can provide multilayered microwave dielectric ceramic elements by a process of lamination and cofiring.

DETAILED DESCRIPTION OF THE INVENTION

It is commonly known in the art that $ZrO_2$—$SnO_2$—$TiO_2$ ceramics in solid solution phase have a high quality factor.

The properties of 0.8 $ZrO_2$—0.2 $SnO_2$—1.0 $TiO_2$ microwave ceramics are as follows:

Sintering Temperature: 1360° C.;
Dielectric Constant (@ 7 GHz): 38;
Quality Factor (@ 7 GHz): 7000;
Temperature Coefficient: 0 ppm/°C.

However, as aforementioned and shown above, 0.8 $ZrO_2$—0.2 $SnO_2$—1.0 $TiO_2$ ceramic materials have a sintering temperature higher than 1300° C. Thus, these materials cannot be sintered at a temperature at or less than 1000° C.

The inventors of the present invention discovered that the addition of $BaCuO_2$—CuO ceramics into $ZrO_2$—$SnO_2$—$TiO_2$ ceramics can effectively reduce the sintering temperature to 1000° C. or less. Thus, this invention can provide ceramic materials which can be co-sintered with metals which are high in conductivity to provide laminated microwave ceramic elements having a high dielectric constant and a low dielectric loss.

Specifically, the present invention primarily relates to a dielectric composition comprising two ceramic components, $BaCuO_2$—CuO ceramic and $ZrO_2$—$SnO_2$—$TiO_2$ ceramic. The ratio of the two ceramics is not particularly limited, and can vary depending on the required properties of the products to be made. A preferred ratio is 0.1–50 wt % $BaCuO_2$—CuO ceramic and 99.9–50 wt % $ZrO_2$—$SnO_2$—$TiO_2$ ceramic, and an even more preferred ratio is 0.1–20 wt % $BaCuO_2$—CuO ceramic and 99.9–80 wt % $ZrO_2$—$SnO_2$—$TiO_2$.

In the composition of the present invention, $BaCuO_2$—CuO ceramic is defined as a "low sintering temperature phase." It is noted from the phase diagram that the eutectic point of $BaCuO_2$ and CuO is 926° C. It is preferred that the $BaCuO_2$—CuO ceramic of the present invention comprises 45–55 wt % $BaCuO_2$ and 55–45 wt % CuO, especially 49.1 wt % $BaCuO_2$ and 50.9 wt % CuO.

With respect to the present invention, $ZrO_2$—$SnO_2$—$TiO_2$ ceramic is defined as a "high sintering temperature microwave dielectric ceramic phase." It is preferred that the $ZrO_2$—$SnO_2$—$TiO_2$ ceramic of the present invention comprises 42.5–52.5 wt % $ZrO_2$, 10–20 wt % $SnO_2$, and 33.5–43.5 wt % $TiO_2$, especially 47.3 wt % $ZrO_2$, 14.5 wt % $SnO_2$, and 38.2 wt % $TiO_2$.

The dielectric composition of the present invention is useful in the preparation of laminated microwave ceramic devices. For this preparation, the dielectric composition of the invention can be mixed with an organic vehicle to form slurry; the slurry can be formed into a green tape through a tape casting process; and the green tape can be screen-printed with an electrical conductor paste, and laminated and co-fired to produce multilayered microwave ceramic devices.

Therefore, the invention provides a slurry for use in the preparation of microwave ceramic elements which comprises:
(a) 70–85 wt % dielectric composition comprising 0.1–50 wt % $BaCuO_2$—CuO ceramic and 99.9–50 wt % $ZrO_2$—$SnO_2$—$TiO_2$ ceramic; and
(b) 30–15 wt % organic vehicle.

The dielectric composition of the slurry of the present invention preferably comprises 0.1–20 wt % $BaCuO_2$—CuO ceramic and 99.9–80 wt % $ZrO_2$—$SnO_2$—$TiO_2$. It is preferred that the $BaCuO_2$—CuO ceramic comprises 45–55 wt % $BaCuO_2$ and 55–45 wt % CuO, especially 49.1 wt % $BaCuO_2$ and 50.9 wt % CuO. It is preferred that the $ZrO_2$—$SnO_2$—$TiO_2$ ceramic comprises 42.5–52.5 wt % $ZrO_2$, 10–20 wt % $SnO_2$, and 33.5–43.5 wt % $TiO_2$, especially 47.3 wt % $ZrO_2$, 14.5 wt % $SnO_2$, and 38.2 wt % $TiO_2$ (i.e. $(Zr_{0.8}Sn_{0.2})TiO_4$).

The organic vehicle of the slurry preferably comprises a binder such as polyvinylbutyral (PVB) and polyvinylalcohol (PVA); an organic solvent such as n-propanol, toluene and ethanol; and/or a plasticizer such as dibutyl phthalate and polyethylene glycol (PEG).

The slurry of the present invention can be used in the preparation of a microwave dielectric ceramic element. In this application, the slurry is first formed into a green body and then fired at a temperature no higher than 1000° C. The firing process comprises two stages including binder burnout and densification. The firing process should be carried out in an ambient atmosphere or in a nitrogen/hydrogen atmosphere. As known by persons skilled in the field, in the binder burnout stage, the organic binder is removed from the green body and in the sintering stage, the green body is densified. The sintering stage should be carried out at a temperature of 800°–1000° C. for 15–150 minutes and more preferred at a temperature of 950°–1000° C. for 30–120 minutes. The prepared microwave dielectric ceramic devices has a dielectric constant of 35–40 and a quality factor of 20–200 at 1 MHz, or a dielectric constant of 35–40 and a quality factor of 1000–5000 at 7 GHz and thus meets the requirements for a high quality factor and a high dielectric constant.

The present invention further provides a process for the preparation of multilayered microwave dielectric ceramic devices. This process involves screen printing a conductor pastes, e.g. gold, silver or copper, on a ceramic green sheet, via-filling, stacking and laminating ceramic green sheet into a ceramic green laminate. The ceramic materials for the preparation of the ceramic green compact has a dielectric composition of:
(a) 0.1–50 wt % $BaCuO_2$—CuO ceramic; and
(b) 99.9–50 wt % $ZrO_2$—$SnO_2$—$TiO_2$ ceramic.

It is preferred that the dielectric composition comprises 0.1–20 wt % $BaCuO_2$—CuO ceramic and 99.9–80 wt % $ZrO_2$—$SnO_2$—$TiO_2$. The $BaCuO_2$—CuO ceramic preferably comprises 45–55 wt % $BaCuO_2$ and 55–45 wt % CuO, and more preferably 49.1 wt % $BaCuO_2$ and 50.9 wt % CuO. The $ZrO_2$—$SnO_2$—$TiO_2$ ceramic preferably comprises 42.5–52.5 wt % $ZrO_2$, 10–20 wt % $SnO_2$, and 33.5–43.5 wt % $TiO_2$, and more preferably 47.3 wt % $ZrO_2$, 14.5 wt % $SnO_2$, and 38.2 wt % $TiO_2$ (i.e. $(Zr_{0.8}Sn_{0.2})TiO_4$).

The following examples further illustrate the invention but are not intended in any way to limit the scope of the invention. It goes without saying that many substitutions and modifications can be made by persons skilled in the field which are still within the scope of the present invention.

EXAMPLES $BaCuO_2$+CuO and $(Zr_{0.8}Sn_{0.2})TiO_4$ ceramic powders were first prepared as follows:

Ceramic powders (99.5% purity) of $ZrO_2$ (37.8 g), $SnO_2$ (11.56 g) and $TiO_2$ (30.6 g) were measured in accordance with the proportions of Zr, Sn and Ti in $(Zr_{0.8}Sn_{0.2})TiO_4$ and milled in a 1-liter PE plastic jar with 2000 g $ZrO_2$ milling balls and 220 cc isopropanol (2-propyl alcohol) for 36 hours to produce a slurry. The slurry was then filtered with a 200 mesh screen, dried in an oven at a temperature of 80° C. for 4 hours, ground into powders and calcined at 1150° C. for six (6) hours. Then, the calcined powders were ground and milled in conditions identical to those for the starting ceramic powders (with the exception that the sintered powders were milled for 4, 8, 12 or 16 hours) to obtain $(Zr_{0.8}Sn_{0.2})TiO_4$ powders. Unless otherwise indicated, the term "ZST" shall hereinafter represent the $(Zr_{0.8}Sn_{0.2})TiO_4$ ceramic powders.

Ceramic powders (99.5% purity) of $BaCO_3$ (44.2 g) and CuO (45.8 g) in a molar ratio of 28:72 were measured and milled in a 1-liter PE plastic jar with 2000 g $ZrO_2$ milling balls and 220 cc isopropanol (2-propyl alcohol) for 24 hours to produce a slurry. The slurry was then filtered, dried, ground in conditions identical to those used when preparing ZST, and calcined at 850° C. for 12 hours. The calcined powders were then ground for 48 hours in the conditions identical to those previously indicated to obtain the ceramic powders of $BaCuO_2$+CuO compound (BCC). $BaCuO_2$ powders (BC) were also prepared according to the same procedures.

EXAMPLE 1

A mixture of 20 g ceramic powders of ZST (1A), 25 cc n-propanol (1-propanol) and 5 wt % polyethylene glycol 200 (PEG 200) were milled in a three-dimensional long-arm mixer with 46 g aluminum oxide milling balls for 2 hours, dried at 80° C. for 1 hour, and then ground. Unless otherwise indicated, each sample was prepared by compressing 1.3 g ground powders under 90 MPa for 15 seconds to form a green body, and sintering the green body at 1000° C. for 120 minutes. The sintering step has two stages. In the first stage, the binder was removed at a heating rate of 5° C./min at a constant temperature of 500° C. for 1 hour. In the second stage, the green compact was transferred directly into a furnace in an ambient atmosphere; temperature is raised to 1000° C. within 5 minutes, and the green body is densified for another 120 minutes. The density of the sintered body was then determined (shown in Table I). Repeating the previous procedures with the exception that 20 g ceramic powder mixture of 10 wt % BC-90 wt % ZST (1B) and 20 g ceramic powder mixture of 10 wt % BCC-90 wt % ZST (1C) were used to replace the 20 g ZST. As shown in Table I, only the ceramic powder mixture of 10 wt % BCC-90wt % ZST provided a sintered body with a density higher than 5.0 gm/cm³. The SEM micrograph of the sintered body which was prepared from the ceramic powder mixture of 10 wt % BCC-90 wt % ZST showed that the relative sintered density was higher than 97%. The sintered bodies prepared from the ceramic powders of ZST and from the ceramic powder mixture of 10 wt % BC-90 wt % ZST were not densified, however.

EXAMPLE 2

The preparation process and measurement procedures were similar to those described in Example 1 except that the ceramic powder mixture of 2.5 wt % BCC and 97.5 wt % ZST was used to replace the ceramic powders of ZST and the green bodies were divided into three groups and sintered at 1000° C. for 30 minutes (2A), 60 minutes (2B), and 120 minutes (2C), respectively. The density and properties of the sintered bodies are shown in Table I.

EXAMPLE 3

The preparation process and measurement procedures were similar to those described in Example 1 except that the ceramic powder mixture of 5 wt % BCC and 95 wt % ZST was used to replace the ceramic powders of ZST and the green bodies were divided into three groups and sintered at 1000° C. for 30 minutes (3A), 60 minutes (3B), and 120 minutes (3C), respectively. The density and properties of the sintered bodies are shown in Table I.

EXAMPLE 4

The preparation process and measurement procedures were similar to those described in Example 1 except that the ceramic powder mixture of 10 wt % BCC and 90 wt % ZST was used to replace the ceramic powders of ZST and the green bodies were divided into three groups and sintered at 1000° C. for 30 minutes (4A), 60 minutes (4B), and 120 minutes (4C), respectively. The density and properties of the sintered bodies are shown in Table I.

EXAMPLE 5

The preparation process and measurement procedures were similar to those described in Example 1 except that the ceramic powder mixture of 15 wt % BCC and 85 wt % ZST was used to replace the ceramic powders of ZST and the green bodies were divided into three groups and sintered at 1000° C. for 30 minutes (5A), 60 minutes (5B), and 120 minutes (5C), respectively. The density and properties of the sintered bodies are shown in Table I.

EXAMPLE 6

The preparation process and measurement procedures were similar to those described in Example 1 except that the ceramic powder mixture of 20 wt % BCC and 80 wt % ZST was used to replace the ceramic powders of ZST and the green bodies were divided into three groups and sintered at 1000° C. for 30 minutes (6A), 60 minutes (6B), and 120 minutes (6C), respectively. The density and properties of the sintered bodies are shown in Table I.

TABLE I

| Ex. No. | sintered density (gm/cm³) | relative sintered density (%) | sintering time (min) | dielectric constant (@ 1 MHz) | quality factor (@ 1 MHz) | dielectric constant (@ 7 GHz) | quality factor (@ 7 GHz) |
|---|---|---|---|---|---|---|---|
| 1A | 2.732 | 53 | 120 | — | — | — | — |
| 1B | 3.222 | 62 | 120 | — | — | — | — |
| 1C | 5.071 | 97 | 120 | 36.45 | 63.69 | 35.01 | 1473 |
| 2A | 4.626 | 88 | 30 | — | — | — | — |
| 2B | 4.755 | 91 | 60 | — | — | — | — |
| 2C | 4.870 | 93 | 120 | 35.49 | 133.51 | 35.87 | 4955 |
| 3A | 4.930 | 94 | 30 | — | — | — | — |
| 3B | 5.003 | 96 | 60 | — | — | — | — |
| 3C | 5.073 | 97 | 120 | 38.16 | 124.67 | 36.67 | 2783 |
| 4A | 4.800 | 92 | 30 | — | — | — | — |

TABLE I-continued

| Ex. No. | sintered density (gm/cm³) | relative sintered density (%) | sintering time (min) | dielectric constant (@ 1 MHz) | quality factor (@ 1 MHz) | dielectric constant (@ 7 GHz) | quality factor (@ 7 GHz) |
|---|---|---|---|---|---|---|---|
| 4B | 5.036 | 96 | 60 | — | — | — | — |
| 4C | 5.071 | 97 | 120 | 36.45 | 63.69 | 35.01 | 1473 |
| 5A | 4.461 | 85 | 30 | — | — | — | — |
| 5B | 4.893 | 94 | 60 | — | — | — | — |
| 5C | 5.041 | 96 | 120 | 37.07 | 18.38 | 31.5 | 819 |
| 6A | 3.991 | 76 | 30 | — | — | — | — |
| 6B | 4.608 | 88 | 60 | — | — | — | — |
| 6C | 4.791 | 92 | 120 | 37.13 | 7.4 | — | — |

As shown in Table I, the ceramic powder mixtures of Examples 1–5 which contained BCC can be densified at a low temperature (1000° C.) and within a short time (60–120 minutes) to reach at least 95% relative density. Thus, the sintering temperature required to density the ceramic powder mixtures is compatible with that needed for highly conductive metals such as gold or copper. Further, all these ceramic powder mixtures have a high dielectric constant (35–40 @ 7 GHz) and a proper quality factor (1000–5000 @ 7 GHz).

In addition, all the ceramic powder mixtures of Examples 1–5 can be co-fired using a low melting point and a low electric resistance metal such as gold or copper so as to prepare multilayered ceramic devices. For the preparation of multilayered ceramic devices, the ceramic mixture is mixed with an organic solvent such as toluene or ethanol, a polymeric binder such as polyvinyl butyral (PVB), and a plasticizer such as bigutyl phthalate (DBP), to produce a slurry which is further tape-cast into a green tape 125 microns thick. The green tape can be cut to become 10×10 cm in size, punched with dies of 125 microns diameter and screen-printed and filled with conductor paste such as gold or silver. The green tape thus made and filled is successively stacked and laminated at a temperature of 60°–100° C. under 1000–3000 psi to produce green laminates. Finally, the green ceramic laminates are removed binder and co-fired in an ambient atmosphere for densification.

The dielectric composition of the present invention can also form ceramic bodies of various shapes using conventional processes such as dry-pressing, cold-pressing and hot-pressing. Taking the dry-pressing as an example, ceramic powders may be mixed with water and binder(s) (e.g. polyvinyl alcohol (PVA)), spray-dried and granulated to improve the fluidity of the powders, and then dry-compressed, binder burnout and densified to produce microwave dielectric ceramic products.

We claim:

1. A dielectric composition comprising:
    (a) 0.1–50 wt % $BaCuO_2$—CuO ceramic; and
    (b) 99.9–50 wt % $ZrO_2$—$SnO_2$—$TiO_2$ ceramic.
2. The composition of claim 1 comprising:
    (a) 0.1–20 wt % $BaCuO_2$—CuO ceramic; and
    (b) 99.9–80 wt % $ZrO_2$—$SnO_2$—$TiO_2$ ceramic.
3. The composition of claim 1 wherein the ceramic (a) comprises 45–55 wt % $BaCuO_2$ and 55–45 wt % CuO.
4. The composition of claim 3 wherein the ceramic (a) comprises 49.1 wt % $BaCuO_2$ and 50.9 wt % CuO.
5. The composition of claim 1 wherein the ceramic (b) comprises 42.5–52.5 wt % $ZrO_2$, 10–20 wt % $SnO_2$ and 33.5–43.5 wt % $TiO_2$.
6. The composition of claim 5 wherein the ceramic (b) comprises 47.3 wt % $ZrO_2$, 14.5 wt % $SnO_2$ and 38.2 wt % $TiO_2$.
7. A slurry for use in the preparation of microwave dielectric elements comprising:
    (a) 70–85 wt % the composition of claim 1; and
    (b) 30–15 wt % organic vehicle.
8. The slurry of claim 7 wherein the organic vehicle comprises organic solvent, organic binder and organic plasticizer.
9. The slurry of claim 7 wherein the slurry is formed into a green body and then fired at a temperature no higher than 1000° C.
10. The slurry of claim 9 wherein the slurry is fired in two stages to provide binder burnout and densification.
11. The slurry of claim 10 wherein the densification stage is conducted at 800°–1000° C. for 15–150 minutes.
12. The slurry claim 9 wherein the slurry is fired in an ambient or a nitrogen/hydrogen atmosphere.
13. A process for preparing multilayered microwave dielectric ceramic devices comprising the steps of:
    providing ceramic green sheets;
    screen printing conductor pastes on each ceramic green sheet;
    via filling;
    stacking and laminating said ceramic green sheets into a ceramic laminate; and
    densifying the ceramic laminate at elevated temperatures, wherein the ceramic green sheets comprise a dielectric composition comprising:
        (a) 0.1–50 wt % $BaCuO_2$—CuO ceramic; and
        (b) 99.9–50 wt % $ZrO_2$—$SnO_2$—$TiO_2$ ceramic.
14. The process of claim 13 wherein the dielectric composition comprises:
    (a) 0.1–20 wt % $BaCuO_2$—CuO ceramic; and
    (b) 99.9–80 wt % $ZrO_2$—$SnO_2$—$TiO_2$ ceramic.
15. The process of claim 13 wherein the ceramic (a) of the dielectric composition comprises 45–55 wt % $BaCuO_2$ and 55–45 wt % CuO.
16. The process of claim 13 wherein the ceramic (a) of the dielectric composition comprises 49.1 wt % $BaCuO_2$ and 50.9 wt % CuO.
17. The process of claim 13 wherein the ceramic (b) of the dielectric composition comprises 42.5–52.5 wt % $ZrO_2$, 10–20 wt % $SnO_2$ and 33.5–43.5 wt % $TiO_2$.
18. The process of claim 13 wherein the ceramic (b) of the dielectric composition comprises 47.3 wt % $ZrO_2$, 14.5 wt % $SnO_2$ and 38.2 wt % $TiO_2$.

* * * * *